United States Patent
Valli et al.

(10) Patent No.: US 11,174,190 B2
(45) Date of Patent: Nov. 16, 2021

(54) LUBRICATION OF PARISON MOULDS IN A METHOD FOR PRODUCING HOLLOW GLASS PRODUCTS

(71) Applicant: SOCABELEC S.A., Ham-sur-Sambre (BE)

(72) Inventors: Raphaël Valli, Presles (BE); Dirk Jongert, Asse (BE); Marco Veri, Sambreville (BE)

(73) Assignee: SOCABELEC S.A., Ham-sur-Sambre (BE)

( * ) Notice: Subject to any disclaimer, the term of this patent is extended or adjusted under 35 U.S.C. 154(b) by 184 days.

(21) Appl. No.: 15/742,680

(22) PCT Filed: Aug. 26, 2016

(86) PCT No.: PCT/EP2016/070211
§ 371 (c)(1),
(2) Date: Jan. 8, 2018

(87) PCT Pub. No.: WO2017/032883
PCT Pub. Date: Mar. 2, 2017

(65) Prior Publication Data
US 2018/0201537 A1    Jul. 19, 2018

(30) Foreign Application Priority Data
Aug. 26, 2015 (EP) .................... 15182604

(51) Int. Cl.
*C03B 13/04* (2006.01)
*C03B 13/16* (2006.01)
(Continued)

(52) U.S. Cl.
CPC .............. *C03B 40/027* (2013.01); *C03B 9/14* (2013.01); *C03B 9/193* (2013.01); *C03B 40/02* (2013.01); *Y02P 40/57* (2015.11)

(58) Field of Classification Search
CPC ......... C03B 40/027; C03B 40/02; C03B 9/14; C03B 9/193
See application file for complete search history.

(56) References Cited

U.S. PATENT DOCUMENTS 2,179,061 A * 11/1939 Smith ................. C10M 135/06
508/299
2,573,337 A    10/1951 Franklin
(Continued)

FOREIGN PATENT DOCUMENTS

EP    0393630    10/1990
GB    975123     11/1964

*Primary Examiner* — Queenie S Dehghan
(74) *Attorney, Agent, or Firm* — Duane Morris LLP; Gregory M. Lefkowitz

(57) ABSTRACT

A method for producing a hollow glass product by an I.S. machine, said method being a press-blow or blow-blow method and implementing at least one parison mould and one blow mould, said method comprising the lubrication of said parison mould, the lubrication comprising spraying via a nozzle, said nozzle being carried by the arm of a mobile robot movable along the parison mould side of the I.S. machine, characterised in that said mobile robot is configured to bring said nozzle into the lubricating position after the glass gob has left the parison mould for the blow mould; spray the lubricant into said parison mould; withdraw said nozzle from the lubricating position before the transfer arm returns between the two half-moulds of the parison mould.

9 Claims, 2 Drawing Sheets

(51) Int. Cl.
*C03B 7/08* (2006.01)
*C03B 21/02* (2006.01)
*C03B 40/027* (2006.01)
*C03B 40/02* (2006.01)
*C03B 9/14* (2006.01)
*C03B 9/193* (2006.01)

(56) References Cited

U.S. PATENT DOCUMENTS

| | | | |
|---|---|---|---|
| 2,846,323 A | 8/1958 | Oppliger | |
| 2,977,237 A | 3/1961 | Vierk et al. | |
| 3,213,024 A * | 10/1965 | Duane | C10M 173/00 508/116 |
| 3,495,962 A | 2/1970 | Norton et al. | |
| 3,519,408 A | 7/1970 | Russell | |
| 3,523,016 A | 8/1970 | Mattos | |
| 3,623,856 A * | 11/1971 | Keller | C03B 9/38 65/169 |
| 3,988,137 A | 10/1976 | Goodwin | |
| 4,119,547 A | 10/1978 | Nachtman et al. | |
| 4,550,057 A * | 10/1985 | Kataoka | B29C 43/52 249/95 |
| 4,579,574 A | 4/1986 | Sugie et al. | |
| 4,867,777 A * | 9/1989 | Doud | C03B 9/40 65/26 |
| 5,139,560 A | 8/1992 | Renkl et al. | |
| 6,902,708 B1 * | 6/2005 | Nutz, Jr. | C03B 40/027 422/116 |
| 8,375,743 B2 * | 2/2013 | Zanella | C03B 9/41 65/26 |
| 2002/0001534 A1 * | 1/2002 | Kuniyoshi | B22F 3/004 419/20 |
| 2005/0157964 A1 * | 7/2005 | Kawagoe | F16C 9/00 384/276 |
| 2010/0175617 A1 * | 7/2010 | Donges | C03B 40/027 118/315 |

\* cited by examiner

LUBRICATION OF PARISON MOULDS IN A METHOD FOR PRODUCING HOLLOW GLASS PRODUCTS

CROSS-REFERENCE TO RELATED APPLICATIONS

This application is a § 371 national stage entry of International Application No. PCT/EP2016/070211, filed Aug. 26, 2016, which claims priority to European Patent Application No. 15182604.7, filed Aug. 26, 2015, the entire contents of which are incorporated herein by reference.

TECHNICAL FIELD

This invention relates to the production of hollow glass products, such as bottles, vials or pots.

STATE OF THE ART

This production implements I.S. [Individual Section] machines, wherein each section is intended to process one gob or several simultaneously, each gob being received and processed in a dedicated parison mould, then a dedicated blow mould.

The parison mould is constituted of two half-moulds defining a vertical joint surface.

The two half-moulds close up on a collar mould at the lower end of the parison mould. The parison mould also comprises a stamp of which the ascending movement produces the piercing of the parison.

The loading of the gob into the parison mould is carried out by gravity by the open upper end thereof.

In the press-blow method, this loading is carried out in the bottom position of the stamp. Then, the upper end of the parison mould is closed by the bottom, then the stamp makes a movement going from the collar mould towards the top, driving the gob with it. After having filled the bottom of the mould (upper part), the glass crosses pressing channels to form the collar.

In the blow-blow method, the loading of the gob is carried out in the top position of the stamp, however relatively short. The upper end of the parison mould is connected to a means to compress the bottom of the gob, having the effect of forming the collar. Then, this upper end is closed by the parison bottom, the stamp is descended and the piercing of the parison is carried out by blowing.

The parison bottom, and the two parison half-moulds are open, and the parison held by the collar mould is transferred into the blow mould by returning along a horizontal axis.

A significant source of appearance faults on the surface of the finished product comes from the relatively strong contact of the gob with the surface of the cavity of the parison mould during loading. It is necessary, to remove these faults, to make sure of the quality of the surface of the cavity, by periodically lubricating it. These lubrications are normally carried out by an operator by means of a brush, soaked in oil beforehand. The operator can proceed with doing this, without stopping the normal functioning of the I.S. machine, but increased safety conditions can stipulate the ejection of gobs intended for the section in question for at least one functioning cycle of the machine.

The lubrication of parison moulds by an operator raises several types of problems.

First, the operator is subjected to an increased temperature and a significant noise, even when using usually-recommended protection.

The exposure to such conditions can be limited over time by national regulations, for example.

In addition, they must coordinate their movements with those of the automated mechanical elements, and can quickly feel stressed and tired from these. On the other hand, the operator lubricates the moulds periodically, according to a more or less random choice, but does not keep the lubrication just to moulds which are really needed.

A method and a device for the automatic lubrication of moulds for forming hollow glass products are known from the document WO2007138226. The lubrication defined in this document, however requires the production line to be stopped, with the aim of inserting a spraying hose into the parison mould when the latter is in a closed position, in other words, when the two half-moulds constituting it are in contact with each other. Such an interruption, of course, causes a loss of yield of the method, because of the decrease in production time. In addition, the products obtained directly after lubrication of the parison mould are generally faulty and must be rejected as the table shown on page 10 of the document WO2007138226 certifies.

Moreover, the lubrication methods from the prior art, whether they are carried out manually or by a robot, have an impact on the lifespan of the moulds through the oxidation generated by depositing the lubricant layer.

DESCRIPTION OF THE INVENTION

An aim of the invention is to increase the yield of a method for producing hollow glass products, while maintaining an unchanged, even superior quality of the products produced.

Another aim of the invention is to increase the lifespan of the moulds used in the scope of a method for producing hollow glass products.

To this end, the invention provides a method for producing a hollow glass product by an I.S. machine, said method being of the press-blow or blow-blow type, and implementing at least one parison mould and one blow mould, said parison mould comprising two half-moulds closing up at each production cycle, at least one glass gob being loaded in the parison mould by gravity, said gob being transferred from the parison mould to the blow mould using a transfer arm after an opening of the two half-moulds of the parison mould, said transfer arm being able to make two-way movements between the parison mould and the blow mould, passing between the two half-moulds of the parison mould, said method comprising a lubrication of said parison mould, the lubrication comprising a spraying via a nozzle, said nozzle being carried by the arm of a mobile robot moving along the parison mould side of the I.S. machine, (i) bringing the nozzle into a lubrication position after the glass gob has departed from the parison mould towards the blow mould;

(ii) spraying the lubricant into said parison mould;

(iii) withdrawing the nozzle from the lubrication position before returning the transfer arm between the two half-moulds of the parison mould.

By nozzle, this means a part comprising a calibrated hole, used to transport the lubricant and to ensure the distribution thereof in the parison moulds.

The use of a mobile robot, configured to carry out the lubrication of the parison mould when the latter is in an open position, after the gob of the parison mould has departed towards the blow mould, has proved to be particularly advantageous, as such a lubrication method does not impede the method for producing hollow glass products and does not consequently require the production line to be interrupted. In addition, the production method according to the invention requires no ejection of gobs intended for the parison moulds in the process of being lubricated, as the nozzle is withdrawn before the transfer arm returns at the level of the parison mould, and therefore before these gobs fall, which can normally follow the cycle of the method.

Because the production method is not interrupted, the lubrication method according to the invention can consequently be carried out at a higher frequency than the lubrication methods of the prior art, which involve the production method to be interrupted, and of which an increase in the frequency goes together with a decrease in the yield of the production method. Moreover, it has been able to be observed that the possibility of carrying out more frequent lubrications in the scope of the production method according to the invention enables to decrease the quantity of lubricant delivered during a lubrication operation of the parison mould. The increase in the frequency of lubrication operations, coupled with the decrease in the dose of lubricant delivered at each lubrication operation has proved to be surprisingly particularly advantageous for preserving the parison moulds from oxidation typically observed in methods of the prior art.

By lubrication position of the nozzle, this means a position of the nozzle wherein the lubricant delivered by the nozzle reaches the internal surface of the parison mould in view of carrying out a lubrication of the latter. The lubrication position is thus a function of the range and the shape of the spraying jet delivered by the nozzle.

According to an advantageous embodiment of the method according to the invention, the nozzle carried by the mobile robot is brought by a movement forward into a lubrication position located above the two parison half-moulds. Such a lubrication position indeed proved to be advantageous, as it does not require the insertion of the nozzle into the space defined by the two half-moulds and consequently enables time to be saved, compared with the methods of the prior art, which provide the insertion of a spraying hose into the parison mould.

According to an advantageous embodiment, the arm of the robot is subdivided into two parts, so as to form a Y-shape, each one of the two parts comprising a nozzle, ensuring the spraying of one of the two half-moulds of the parison mould.

In such an embodiment, during the lubrication step, the first nozzle is oriented towards one of the two half-moulds, before the second nozzle is oriented towards the other of the half-moulds by moving the arm of the robot. The presence of two nozzles each carried by one of the parts of the arm of the robot enables to limit the complexity and the amplitude of the movement of the arm of the robot to successively lubricate the two half-moulds.

According to an advantageous embodiment, the production method is carried out using a production line comprising a plurality of parison moulds, the lubrication of the parison moulds being carried out at regular time intervals, or on the request of the operator, the mobile robot moving the nozzle successively to the level of the different parison moulds, the production line comprising at least one rest position being at one of the ends thereof, or between two successive parison moulds, the mobile robot being parked at said at least one rest position when it has no lubrication operation to carry out for a minimal duration.

Such a rest position which is not directly opposite a parison mould has indeed proved to be advantageous, in order to avoid the robot being exposed too much to the heat sources necessary for moulding the glass in the parison moulds.

Another aim of the invention is to provide a lubricating composition for the lubrication implemented by the production method according to the invention.

To this end, the lubricating composition according to the invention comprises:
 a naphthenic mineral oil, said oil having a weight concentration of between 50% and 70%;
 a dispersion comprising graphite particles, of which the size is between 0.5 µm and 25 µm, said graphite concentration in the dispersion being more than 15% in weight, said dispersion having a weight concentration of between 5% and 25%;
 at least one sulphide fatty acid ester, said fatty acid ester comprising from 4 to 22 carbon atoms and being saturated or unsaturated, said sulphide fatty acid ester having a weight concentration of between 10% and 16%.

It has indeed been able to be highlighted that such a lubricating composition was particularly effective for frequent lubrication operations, but with a lower quantity per lubrication operation than the quantities typically used in the prior art. The use of such a lubricating composition in the production method of the invention enables a decrease in the consumption of lubricant, while supplying a reduced number of products needing to be rejected following a lubrication operation. In addition, it has been able to be observed, that such a lubricating composition has a reduced oxidising action on the moulds that it lubricates, which increases their lifespan.

In an advantageous embodiment, the composition according to the invention comprises polydimethylsiloxane (PDMS), said polydimethylsiloxane having a weight concentration of between 1% and 10%. It has indeed been able to be observed, that adding such an additive would increase the quality of the products coming from the production method, just after a lubrication operation and would again decrease the oxidising action on the moulds of the composition according to the invention.

In an advantageous embodiment, the composition according to the invention comprises an alkene sulphide, comprising from 8 to 18 carbon atoms, said alkene sulphide having a weight concentration of between 5% and 12%.

In an advantageous embodiment, the composition according to the invention comprises a fatty acid methyl ester, comprising from 12 to 22 carbon atoms and being saturated or unsaturated, said sulphide fatty ester having a weight concentration of between 1% and 10%.

It has indeed been observed, that adding one of the two, or according to a preferred embodiment of the two last additives mentioned above, would give optimal performances as regards lubricant consumption, rate of rejected products directly after the operation of lubricating and oxidising the moulds. In particular, it has been able to be observed, that using a composition comprising all the components above, enables to obtain a rate of rejected products that is equal to zero, which ensures a maximum yield of the method.

The invention therefore is also based on a production method according to the invention, wherein the lubrication is carried out using one of the lubricating compositions according to the invention detailed above.

The production method according to the invention when it is implemented with a composition according to the invention, indeed enables to totally remove the yield losses inherent to the lubrication operations implemented by the production methods of the prior art. In addition, as already stated above, using a lubricating composition according to the invention optimises the lifespan of the moulds implemented by the production method.

Another aim of the invention is to provide a device for the implementation of lubrication operations of the production method according to the invention.

To this end, the device for implementing the lubrication operations of the production method according to the invention comprises:
- a robot comprising a pressurised lubricant tank and a mobile arm comprising a nozzle, the robot moving along the parison mould side of the I.S. machine
- said robot being configured to
  (i) bring the nozzle into a lubrication position after the glass gob has departed from the parison mould towards the blow mould;
  (ii) spraying the lubricant into said parison mould;
  (iii) withdrawing the nozzle from the lubrication position before returning the transfer arm between the two half-moulds of the parison mould.

According to an advantageous embodiment, the device according to the invention comprises a rail along which said robot can be moved, said rail following the different parison moulds of the I.S. machine.

According to an advantageous embodiment, the rail is longer than the I.S. machine, the surplus length of a sufficiently wide rest position to park the robot at a distance from the heat sources of the I.S. machine, necessary for moulding the glass.

Such a rest position indeed enables to avoid a continuous heating of the robot, and consequently, parking the robot in good conditions when it does not carry out lubrication operations.

According to an advantageous embodiment, a replica of the parison mould to be lubricated implemented by the I.S. machine, is installed at the level of the rest position. Such a replica has indeed proved to be very useful for calibrating the robot of the device according to the invention. A good distribution of lubricant over the internal surface of the moulds indeed requires the nozzle and the robot to be calibrated. A replica installed at the level of the rest position provides precious assistance to the operator, who can carry out final adjustments on the robot and the nozzle without interrupting the production line.

According to an advantageous embodiment, said replica is of a colour offering a visible contrast to the naked eye with the colour of the lubricating composition implemented in the production method. Such a visual contrast will enable an easier observation by the operator distributing the lubricant over the internal surface of the mould, which will facilitate the calibration of the robot and of the nozzle.

According to a particularly advantageous embodiment, the replica is of a clearer colour than the parison moulds implemented in the I.S. machine. The lubrication and the moulds implemented by the I.S. machine generally being of a dark colour, it is useful to make the replica in a clearer colour in view of offering an optimal contrast.

According to an advantageous embodiment, the arm of the robot comprises a removable part whereon the nozzle is attached. Indeed, it has been able to be observed, that in practice, the arm of the robot is exposed to movements that are sometimes complex and hard to anticipate from the different bodies of the I.S. machine. It has therefore proved to be really useful to provide that the part of the arm of the robot supporting the nozzle can easily be replaced in case of damage due to an impact that was too strong between it and the I.S. machine. This removable part can therefore be detached and replaced by the operator without needing to carry out a heavy repair to the robot.

According to an advantageous embodiment, the removable part of the arm of the robot is subdivided into two parts, so as to form a Y-shape, each one of the parts comprising a nozzle. This specific arrangement has indeed proved to be effective in view of the successive lubrication of the two half-moulds, as it decreases the complexity and the amplitude of the movement of the arm of the robot to successively lubricate the two half-moulds.

According to an advantageous embodiment, said rail is assembled above the I.S. machine of the production method, said rail being connected to a beam comprising perforations, said perforations giving access to the control switches of the I.S. machine.

According to an advantageous embodiment, the robot according to the invention is equipped with a detection camera in view of preventing collisions with bodies of the I.S. machine. In this embodiment, the robot is configured to adapt the trajectory thereof in case of encountering a body of the I.S. machine in view of strongly reducing the risk of damage to the robot and to the I.S. machine.

It is important to note that the robot can be configured such that the lubrication is frilly automated and carried out at regular time intervals, but it can also be configured in a semi-automatic mode wherein the control is, in part, ensured by a human operator who can, for example, determine which mould needs to be lubricated and orient the robot in this direction.

In addition, in an advantageous embodiment, the robot of the device according to the invention can be configured to carry out the lubrication of the collar moulds of the parison moulds. In this case, the lubrication is however carried out following a stopping of the production line, with the parison moulds in a closed position.

BRIEF DESCRIPTION OF THE FIGURES

These aspects, as well as other aspects of the invention will be clarified in the detailed description of specific embodiments of the invention, reference being made to the drawings of the figures, wherein.

The figures are not drawn to scale. Generally, similar elements are recorded by similar references in the figures.

DETAILED DESCRIPTION OF SPECIFIC EMBODIMENTS

Figure 1:
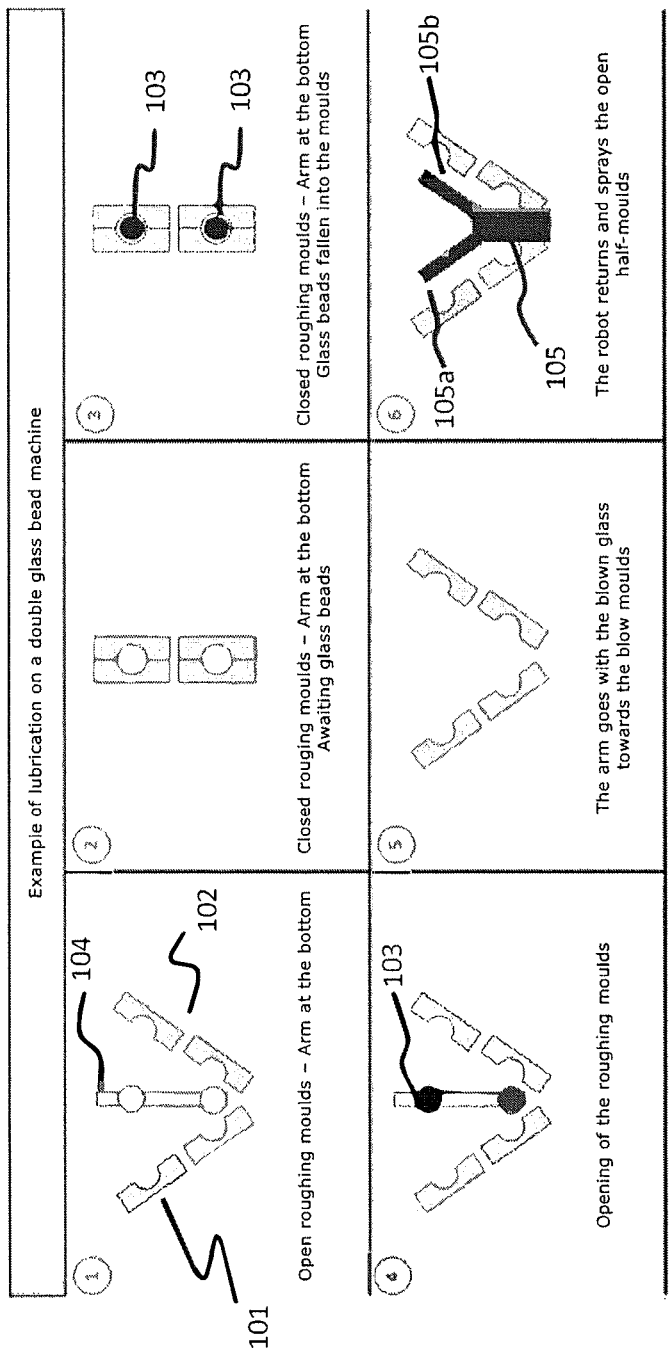
FIG. 1 is a schematic view of the lubrication implemented by an embodiment of the production method according to the invention.

FIG. 1 therefore illustrates the lubrication implemented by the press-blow or blow-blow production method according to the invention. The parison mould comprising two half-moulds 101, 102 with a double section closing up at each production cycle, two glass gobs 103 being loaded into the parison mould by gravity. The gobs 103 are transferred from the parison mould to the blow mould using a transfer arm 104 after an opening of the two half-moulds 101, 102 of the parison mould. The transfer arm 104 is able to carry out two-way movements between the parison mould and the blow mould by passing between the two half-moulds 101, 102 of the parison mould, in order to transfer the preformed gobs 103 from the parison mould to the blow mould. The lubrication of said parison mould, the lubrication comprising a spraying by the nozzles 105a, 105b, said nozzles 105a, 105b being carried by the Y-shaped arm 105 of the mobile robot moving along the parison mould side of the I.S. machine. The mobile robot is configured to (i) bring said nozzles 105a, 105b into a lubrication position after the glass gob has departed from the parison mould towards the blow mould;

(ii) spraying the lubricant into said parison mould;

(iii) withdrawing said nozzles 105a, 105b from the lubrication position before returning the transfer arm between the two half-moulds of the parison mould.

Figure 2:
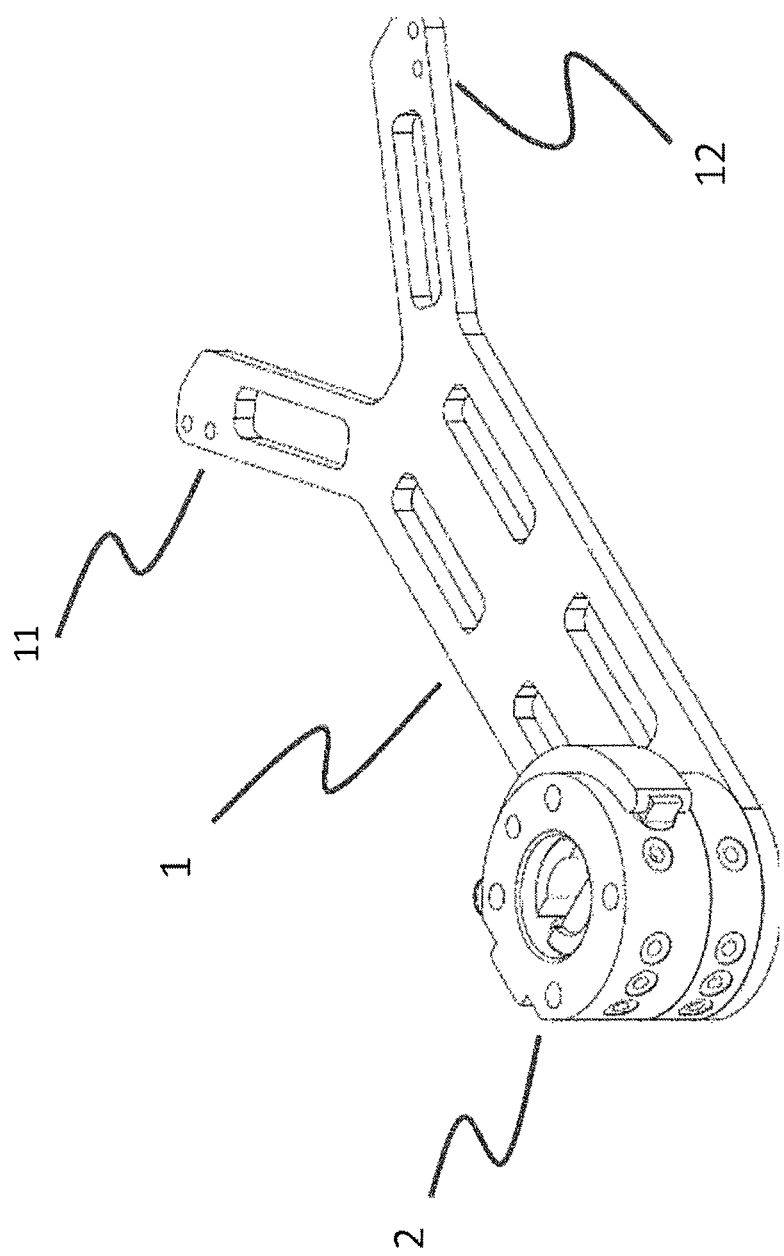
FIG. 2 is an elevated view of an embodiment of the arm of the robot.

FIG. 2 represents the arm of the robot implemented in the production method according to the invention. The part 1 which is subdivided into two parts 11 and 12 so as to form a Y-shape, constitutes the removable part of the arm of the robot which can easily be replaced in case of destructive collision with the bodies of the I.S. machine or other surrounding tools. This part 1 is at the robot using an adapter flange 2. The two parts 11 and 12 are intended to receive the nozzles 105a and 105b which respectively lubricate each half-mould 101, 102 of the parison mould. The lubrication of each half-mould is carried out sequentially, in other words, by first lubricating the first half-mould 101 and then the second half-mould 102 (or vice versa) after the robot has adequately oriented the arm respectively into the lubrication position of the first half-mould 101 and then into the lubrication position of the second half-mould 102 (or vice versa). The presence of two nozzles 105a and 105b advantageously reduces the complexity and the amplitude of the movement of the arm to be implemented by the robot to orient the arm into the lubrication position of the first and of the second half-mould.

It will seem obvious for a person skilled in the art that the present invention is not limited to the examples illustrated and defined above. The invention comprises each one of the new characteristics, as well them combined. The presence of reference numbers cannot be considered as exhaustive. The use of the word "comprises" cannot, in any way, exclude the presence of other elements other than those mentioned. The use of the definite article "a" to introduce an element does not exclude the presence of a plurality of these elements. The present invention has been defined in relation to specific embodiments, which have a purely illustrative value and must not be considered as exhaustive.

The invention claimed is:

1. Method for producing a hollow glass product by an I.S. machine, said method being of the press-blow or blow-blow type, and implementing at least one parison mould and one blow mould, said parison mould comprising two half-moulds closing up at each production cycle, at least one glass gob being loaded into the parison mould by gravity, said gob being transferred from the parison mould to the blow mould using a transfer arm after an opening of two half-moulds of the parison mould, said transfer arm being able to carry out two-way movements between the parison mould and the blow mould and passing between the two half-moulds of the parison mould, said method comprising a lubrication of said parison mould, said lubrication being carried out without interrupting the production method and comprising a spraying of a lubricant, into said open parison mould, by at least one nozzle, wherein said nozzle is carried by a movable arm connected to a mobile robot external to the I.S. machine along the parison mould side of the I.S. machine, said mobile robot being configured to:

(i) bring said nozzles into a lubrication position after the glass gob has departed from the parison mould towards the blow mould;

(ii) after lubrication, withdrawing said nozzle from the lubrication position before returning the transfer arm between the two half-moulds of the parison mould;

wherein the one half of each of the two mould halves and the remaining half of each of the two mould halves are sprayed sequentially while the two mould halves are separated.

2. Production method according to claim 1, according to which the nozzle carried by the mobile robot is brought by a movement forward into the lubrication position from a rest position, said lubrication position being located above the two half-moulds of the parison mould.

3. Production method according to claim 1, according to which the production method is carried out using a production line comprising a plurality of parison moulds, the lubrication of the parison moulds being carried out at regular time intervals, the mobile robot moving the nozzle successively at the level of the different parison moulds, the production line comprising at least one rest position being located at one of the ends thereof, or between two successive parison moulds, the mobile robot being parked at said at least one rest position when it has no lubrication operation to carry out for a minimum duration.

4. Method for producing a hollow glass product by an I.S. machine, said method being of the press-blow or blow-blow type, and implementing at least one parison mould and one blow mould, said parison mould comprising two half-moulds closing up at each production cycle, at least one glass gob being loaded into the parison mould by gravity, said gob being transferred from the parison mould to the blow mould using a transfer arm after an opening of two half-moulds of the parison mould, said transfer arm being able to carry out two-way movements between the parison mould and the blow mould and passing between the two half-moulds of the parison mould, said method comprising a lubrication of said parison mould, said lubrication being carried out without interrupting the production method and comprising a spraying of a lubricant, into said open parison mould, by at least one nozzle, wherein said nozzle is carried by a movable arm connected to a mobile robot external to the I.S. machine along the parison mould side of the I.S. machine, said mobile robot being configured to:

(i) bring said nozzles into a lubrication position after the glass gob has departed from the parison mould towards the blow mould;

(ii) after lubrication, withdrawing said nozzle from the lubrication position before returning the transfer arm between the two half-moulds of the parison mould;

wherein the one half of each of the two mould halves and the remaining half of each of the two mould halves are sprayed sequentially, wherein the movable arm of the mobile robot is subdivided into two parts, and wherein each one of the two parts comprising a nozzle positioned to spray lubricant on one half of each parison mould.

5. Production method according to claim 4, wherein the movable arm comprises a flange for connecting and disconnecting to the mobile robot.

6. Production method according to claim 4, according to which the nozzle carried by the mobile robot is brought by a movement forward into the lubrication position from a rest position, said lubrication position being located above the two half-moulds of the parison mould.

7. Production method according to claim 4, according to which the production method is carried out using a production line comprising a plurality of parison moulds, the lubrication of the parison moulds being carried out at regular time intervals, the mobile robot moving the nozzle successively at the level of the different parison moulds, the production line comprising at least one rest position being located at one of the ends thereof, or between two successive parison moulds, the mobile robot being parked at said at least one rest position when it has no lubrication operation to carry out for a minimum duration.

8. A method for producing a hollow glass product by an I.S. machine, said method being of the press-blow or blow-blow type, and implementing at least one parison mould and one blow mould, said parison mould comprising two half-moulds closing up at each production cycle, at least one glass gob being loaded into the parison mould by gravity, said gob being transferred from the parison mould to the blow mould using a transfer arm after an opening of two half-moulds of the parison mould, said transfer arm being able to carry out two-way movements between the parison mould and the blow mould and passing between the two half-moulds of the parison mould, said method comprising a lubrication of said parison mould, said lubrication being carried out without interrupting the production method and comprising a spraying of a lubricant, into said open parison mould, by at least one nozzle, wherein said nozzle is carried by a movable arm connected to a mobile robot external to the I.S. machine along the parison mould side of the I.S. machine, said mobile robot being configured to:
(i) bring said nozzles into a lubrication position after the glass gob has departed from the parison mould towards the blow mould;
(ii) after lubrication, withdrawing said nozzle from the lubrication position before returning the transfer arm between the two half-moulds of the parison mould;

wherein the movable arm of the mobile robot is subdivided into two parts, and wherein each one of the two parts comprises a nozzle positioned to spray lubricant on one half of each parison mould, wherein the one half of each of the two mould halves and the remaining half of each of the two mould halves are sprayed sequentially while the two mould halves are separated.

9. Production method according to claim 8, wherein the movable arm is subdivided into two parts to form a Y-shape.

* * * * *